(12) United States Patent
Talucci (10) Patent No.: US 7,782,878 B2
(45) Date of Patent: Aug. 24, 2010

(54) SYSTEM AND METHOD FOR SHARING AN IP ADDRESS

(75) Inventor: Fabrizio Talucci, San Jose, CA (US)

(73) Assignee: i2Telecom IP Holdings, Inc., Southlake, TX (US)

(*) Notice: Subject to any disclaimer, the term of this patent is extended or adjusted under 35 U.S.C. 154(b) by 256 days.

(21) Appl. No.: 11/202,050

(22) Filed: Aug. 11, 2005

(65) Prior Publication Data

US 2006/0034296 A1    Feb. 16, 2006

Related U.S. Application Data

(60) Provisional application No. 60/601,916, filed on Aug. 16, 2004.

(51) Int. Cl.
   H04L 12/28    (2006.01)

(52) U.S. Cl. .............. 370/401; 370/230; 370/231; 370/389; 370/420; 370/465

(58) Field of Classification Search ............. 370/229, 370/230.1, 230, 231, 235, 389, 392–394, 370/395.21, 396, 399, 401, 412, 413, 420, 370/428–29, 464–466, 474, 475, 395.1, 429; 709/200, 221, 223, 224, 231, 232, 220
See application file for complete search history.

(56) References Cited

U.S. PATENT DOCUMENTS

| | | | |
|---|---|---|---|
| 5,402,481 A | 3/1995 | Waldman | |
| 5,809,128 A | 9/1998 | McMullin | |
| 5,835,727 A * | 11/1998 | Wong et al. | 709/238 |
| 5,987,103 A | 11/1999 | Martino | |
| 6,014,440 A | 1/2000 | Melkild et al. | |
| 6,061,334 A * | 5/2000 | Berlovitch et al. | 370/255 |
| 6,091,732 A * | 7/2000 | Alexander et al. | 370/401 |
| 6,091,802 A * | 7/2000 | Smith et al. | 379/10.03 |
| 6,104,757 A | 8/2000 | Rhee | |
| 6,118,768 A | 9/2000 | Bhatia et al. | |
| 6,125,113 A | 9/2000 | Farris et al. | |
| 6,128,664 A * | 10/2000 | Yanagidate et al. | 709/228 |
| 6,141,345 A | 10/2000 | Goeddel et al. | |
| 6,185,288 B1 | 2/2001 | Wong | |
| 6,256,778 B1 | 7/2001 | Oliver | |
| 6,307,853 B1 | 10/2001 | Storch et al. | |
| 6,351,464 B1 | 2/2002 | Galvin et al. | |
| 6,359,880 B1 | 3/2002 | Curry et al. | |

(Continued)

OTHER PUBLICATIONS

Unknown Author, Vonage DigitalVoice, 2002, Vonage Holdings Corp., from vonage.com circa 2002.*

(Continued)

*Primary Examiner* — Pankaj Kumar
*Assistant Examiner* — Mark A Mais
(74) *Attorney, Agent, or Firm* — Toler Law Group (57) ABSTRACT

Means for sharing an IP address between a first and second network device, the first device having an assigned IP address and the second network device having one or more port numbers reserved for use solely by the second network device. The second network device is connected serially between the first network device and an Internet access device. The second network device creates packets using the IP address and one of the one or more reserved port numbers and sends the packets to the Internet access device.

13 Claims, 5 Drawing Sheets

U.S. PATENT DOCUMENTS

| | | | | |
|---|---|---|---|---|
| 6,363,081 | B1* | 3/2002 | Gase | 370/466 |
| 6,389,005 | B1 | 5/2002 | Cruickshank | |
| 6,434,139 | B1 | 8/2002 | Liu et al. | |
| 6,445,694 | B1 | 9/2002 | Swartz | |
| 6,449,251 | B1* | 9/2002 | Awadallah et al. | 370/229 |
| 6,496,477 | B1 | 12/2002 | Perkins et al. | |
| 6,542,497 | B1 | 4/2003 | Curry et al. | |
| 6,597,686 | B1 | 7/2003 | Smyk | |
| 6,603,774 | B1 | 8/2003 | Knappe et al. | |
| 6,618,761 | B2 | 9/2003 | Munger et al. | |
| 6,636,504 | B1 | 10/2003 | Albers et al. | |
| 6,654,366 | B1* | 11/2003 | Ketcham | 370/352 |
| 6,658,496 | B1 | 12/2003 | Minakata et al. | |
| 6,700,956 | B2 | 3/2004 | Chang et al. | |
| 6,711,175 | B1* | 3/2004 | Rautiainen et al. | 370/458 |
| 6,754,709 | B1* | 6/2004 | Gbadegesin | 709/227 |
| 6,760,324 | B1* | 7/2004 | Scott et al. | 370/352 |
| 6,763,226 | B1 | 7/2004 | McZeal, Jr. | |
| 6,771,594 | B1 | 8/2004 | Upadrasta | |
| 6,788,769 | B1 | 9/2004 | Waites | |
| 6,795,540 | B1 | 9/2004 | Mow | |
| 6,822,957 | B1* | 11/2004 | Schuster et al. | 370/389 |
| 6,826,174 | B1 | 11/2004 | Erekson et al. | |
| 6,856,612 | B1 | 2/2005 | Bjelland et al. | |
| 6,895,000 | B2 | 5/2005 | Lai et al. | |
| 6,907,031 | B1 | 6/2005 | Ehlinger et al. | |
| 6,944,167 | B1* | 9/2005 | McPherson | 370/401 |
| 6,947,417 | B2* | 9/2005 | Laursen et al. | 370/389 |
| 6,954,454 | B1 | 10/2005 | Schuster et al. | |
| 7,002,995 | B2* | 2/2006 | Chow et al. | 370/485 |
| 7,009,956 | B2* | 3/2006 | Heinonen et al. | 370/338 |
| 7,012,888 | B2 | 3/2006 | Schoeneberger et al. | |
| 7,016,481 | B2 | 3/2006 | McElvaney | |
| 7,046,683 | B1 | 5/2006 | Zhao | |
| 7,092,380 | B1 | 8/2006 | Chen et al. | |
| 7,099,944 | B1* | 8/2006 | Anschutz et al. | 709/227 |
| 7,113,500 | B1 | 9/2006 | Bollinger et al. | |
| 7,145,900 | B2 | 12/2006 | Nix et al. | |
| 7,212,622 | B2 | 5/2007 | Delaney et al. | |
| 7,213,766 | B2 | 5/2007 | Ryan et al. | |
| 7,257,106 | B2* | 8/2007 | Chen et al. | 370/338 |
| 7,283,517 | B2* | 10/2007 | Yan et al. | 370/352 |
| 7,283,542 | B2* | 10/2007 | Mitchell | 370/401 |
| 7,286,537 | B2* | 10/2007 | Roh | 370/392 |
| 7,302,053 | B2 | 11/2007 | Chang et al. | |
| 7,336,654 | B2* | 2/2008 | Barkley et al. | 370/352 |
| 7,342,920 | B2* | 3/2008 | Ying et al. | 370/352 |
| 7,369,563 | B2* | 5/2008 | Choi et al. | 370/401 |
| 7,382,786 | B2* | 6/2008 | Chen et al. | 370/401 |
| 7,424,024 | B2* | 9/2008 | Chen et al. | 370/401 |
| 2001/0038033 | A1 | 11/2001 | Habib | |
| 2002/0007273 | A1 | 1/2002 | Chen | |
| 2002/0052965 | A1 | 5/2002 | Dowling | |
| 2002/0097843 | A1 | 7/2002 | Krol et al. | |
| 2002/0131604 | A1 | 9/2002 | Amine | |
| 2002/0147912 | A1 | 10/2002 | Shmueli et al. | |
| 2002/0184376 | A1 | 12/2002 | Sternagle | |
| 2002/0191621 | A1 | 12/2002 | Jha | |
| 2002/0191768 | A1 | 12/2002 | Stoughton | |
| 2003/0002479 | A1 | 1/2003 | Vortman et al. | |
| 2003/0012137 | A1 | 1/2003 | Abdelilah et al. | |
| 2003/0023669 | A1 | 1/2003 | DeLima et al. | |
| 2003/0093606 | A1 | 5/2003 | Mambakkam et al. | |
| 2003/0110257 | A1 | 6/2003 | Hyun et al. | |
| 2003/0112820 | A1 | 6/2003 | Beach | |
| 2003/0123388 | A1 | 7/2003 | Bradd | |
| 2003/0161453 | A1 | 8/2003 | Veschi | |
| 2003/0204619 | A1 | 10/2003 | Bays | |
| 2003/0214939 | A1 | 11/2003 | Eldumiati et al. | |
| 2003/0219006 | A1 | 11/2003 | Har | |
| 2003/0224780 | A1 | 12/2003 | Rodman et al. | |
| 2004/0019539 | A1 | 1/2004 | Raman et al. | |
| 2004/0032860 | A1 | 2/2004 | Mundra et al. | |
| 2004/0032862 | A1 | 2/2004 | Schoeneberger et al. | |
| 2004/0047451 | A1 | 3/2004 | Barker et al. | |
| 2004/0086093 | A1 | 5/2004 | Schranz | |
| 2004/0114581 | A1 | 6/2004 | Hans et al. | |
| 2004/0133668 | A1 | 7/2004 | Nicholas, III | |
| 2004/0141508 | A1 | 7/2004 | Schoeneberger et al. | |
| 2004/0141758 | A1 | 7/2004 | El-Reedy | |
| 2004/0165578 | A1 | 8/2004 | Burritt et al. | |
| 2004/0205023 | A1 | 10/2004 | Hafer et al. | |
| 2004/0205777 | A1 | 10/2004 | Zalenski et al. | |
| 2004/0218583 | A1 | 11/2004 | Adan et al. | |
| 2004/0248590 | A1 | 12/2004 | Chan et al. | |
| 2004/0258003 | A1 | 12/2004 | Kokot et al. | |
| 2005/0002506 | A1 | 1/2005 | Bender et al. | |
| 2005/0074031 | A1 | 4/2005 | Sunstrum | |
| 2005/0074122 | A1 | 4/2005 | Fascenda | |
| 2005/0089052 | A1 | 4/2005 | Chen et al. | |
| 2005/0091392 | A1 | 4/2005 | Gesswein et al. | |
| 2005/0094621 | A1 | 5/2005 | Acharya et al. | |
| 2005/0138183 | A1 | 6/2005 | O'Rourke et al. | |
| 2005/0180464 | A1 | 8/2005 | McConnell et al. | |
| 2005/0195799 | A1 | 9/2005 | Burne et al. | |
| 2005/0201414 | A1 | 9/2005 | Awais | |
| 2005/0220083 | A1 | 10/2005 | Takeuchi | |
| 2005/0243733 | A1 | 11/2005 | Crawford et al. | |
| 2006/0008059 | A1 | 1/2006 | Ying et al. | |
| 2006/0029062 | A1 | 2/2006 | Rao et al. | |
| 2006/0029063 | A1 | 2/2006 | Rao et al. | |
| 2006/0031393 | A1 | 2/2006 | Cooney et al. | |
| 2006/0037071 | A1 | 2/2006 | Rao et al. | |
| 2006/0039356 | A1 | 2/2006 | Rao et al. | |
| 2006/0208066 | A1 | 9/2006 | Finn et al. | |
| 2006/0276230 | A1 | 12/2006 | McConnell | |
| 2007/0248081 | A1 | 10/2007 | Barkley et al. | |
| 2008/0025291 | A1 | 1/2008 | Barkley et al. | |

OTHER PUBLICATIONS

Rosenberg, J. et al. "STUN—Simple Traversal of User Datagram Protocol (UDP) Through Network Address Translators (NATS)," RFC 3489, Mar. 2003, pp. 1-47.

Schulzrinne, H. "Dynamic Host Configuration Protocol (DHCP-for-IPv4) Option for Session Initiation Protocol (SIP) Servers," RFC 3361, Aug. 2002, pp. 1-7.

Camarillo, G. et al. "Integration of Resource Management and Session Initiation Protocol (SIP)," RFC 3312, Oct. 2002, pp. 1-30.

"EcoCarrier-carrier, long distance, call, VoIP, ITSP, service", www.ecocarrier.com, printed Jun. 13, 2005, pp. 1-3.

"EcoPhone + VoIPIPhone Q-FONE-USB", which appears to come from www.qiiq.com, Jun. 10, 2005, printed Jun. 10, 2005, pp. 1-3.

"Brief Introduction to QiiQ Communications Inc. and Eccocarrier Inc.", www.qiiq.com, printed Jun. 10, 2005 and Jul. 17, 2005, pp. 1-7.

Trembley, J. "VoIP makes real-time billing a necessity", Billing Plus, vol. 6, No. 17, Oct. 4, 2004, p. 13.

"Pre-paid Call Credits—Adding Extra Call Credits", www.2hands.com.au, (added to catalog Jun. 30, 2004), printed Jun. 1, 2005, pp. 1-2.

"SIPphoneCasting. Inspired by: Skype Podcast Recorder = SkypeCasters", linuxathome.com, Dec. 29, 2004, pp. 1-4.

"CommGenie VoIP Suite", www.nexge.com, printed Jun. 1, 2005, pp. 1-3.

"Web Based, VoIP Billing, VoIP Routing, and VoIP Management Software", www.webvoip.com, printed Jun. 1, 2005, pp. 1-2.

Tittel, E. "Cool Tools: USB Desktop Peripherals and Devices", www.certmag.com, Jun. 2005, pp. 1-7.

Bennet, B. "Memory in a Flash", www.theage.com.au, Jan. 31, 2004, pp. 1-3.

Barkley et al., U.S. Appl. No. 10/969,516, entitled "Portable VoIP Service Access Module," filed on Oct. 20, 2004, 18 pages.

"Pocki Phone VoIP Softphone + USB Flash Disk Drive (128M)", www.welltech.com/newsletter/vol_5/20041005.htm, Oct. 5, 2004, 2 pages.

Rosenberg, J. et al., "SIP: Session Initiation Protocol," RFC 3261, Jun. 2002, pp. 1-18.

Douglas F. Bender, U.S. Appl. No. 12/098,947, entitled "Systems and Methods of Making a Call," filed on Apr. 7, 2008, 32 pages.

PCT/US05/029324, International Preliminary Report issued Feb. 20, 2007 with Written Opinion (originally mailed Nov. 29, 2006) (6 pages).

PCT/US05/029324, International Search Report mailed Nov. 29, 2006 (3 pages).

* cited by examiner

| SOURCE PORT | DESTINATION PORT |
|---|---|
| SEQUENCE NUMBER ||
| ACKNOWLEDGMENT NUMBER ||
| DATA OFFSET / RESERVED / FLAGS | WINDOW |
| CHECKSUM | URGENT POINTER |
| OPTIONS (+ PADDING) ||
| DATA (VARIABLE) ||

FIGURE 5

SYSTEM AND METHOD FOR SHARING AN IP ADDRESS

CROSS REFERENCE TO RELATED APPLICATIONS

This application claims priority under 35 U.S.C. §119(e) from provisional application No. 60/601,916 filed Aug. 16, 2004. The 60/601,916 provisional application is incorporated by reference herein, in its entirety, for all purposes.

BACKGROUND

The present invention relates generally to Internet access. More particularly, the present invention provides means for sharing an IP address assigned to a first network device by a second network device such that packets originating from the second network device appear to be originating from the first network device.

The Internet has had a profound impact on the way society communicates. Today, the Internet is used for personal communications, for business communications, for shopping, for entertainment, for news, and more. One of the more recent—and evolving—applications is the use of the Internet for voice communications.

The Internet uses "virtual" circuits that use packets and protocols to establish and maintain communications between points on the network. Each "point" on the Internet has a unique IP address. In theory, a packet from one address is sent to another address. In practice, however, not every device on the Internet can have an address.

The problem, while not solved, has been mitigated by the designation of a group of IP addresses as private addresses. These addresses may be used by anyone and are not assignable. More importantly, these addresses are not recognized by Internet protocols. Anyone is free to use these private addresses on their internal networks. The primary restrictions are that packets with these private addresses in their source or destination fields must be filtered from the Internet, and that routing information for networks with these private addresses must not be promulgated to the Internet. Because a private IP address may be shared among any number of devices, allowing private addresses on to the Internet could result in traffic going to the wrong destination and in corruption of routing tables.

For private addresses to be reusable, they must be reliably hidden from the Internet. Routing ports that connect to the Internet are expected to drop any packets with private network addresses, and routers that connect to the Internet are expected to refrain from sending route updates for private networks. These tasks are performed by a device using network address translation (NAT) or NAT with port translation (NAPT). One side of the NAT component interfaces with the Internet using a global (or public) address. The other side of the NAT component interfaces with an internal network using local (private) addresses. A global address is mapped to a private address by the NAT device. NAPT adds port translation. When a device inside the local network wants to communicate with a device on the Internet, the NAPT substitutes its own global source IP address and a new port number for the local address and port number of the private network device. For NAPT, the NAT router must keep track of how the internal private addresses map to particular ports on the outward-facing IP address. Of course, at any given time, a particular node may have multiple ports active, which requires the router to keep track of all these connections.

A consumer typically will obtain a single IP address with an Internet service provider (ISP). Some ISPs structure their product offerings such that only a single MAC address and IP address may be used on their service. The Internet access device (e.g. a DSL modem or a cable modem) merely bridges the communications between the Internet access device and a single computer. An ISP will receive and process packets generated by this computer. Packets from other network devices will be discarded. In this environment, a consumer must either restrict access to a single computer or invest in purchasing additional equipment (e.g., a router that supports NAT). However, while NAT devices may be appropriate for many businesses, not every consumer wants to become a network engineer simply to have access to VoIP services or other services requiring a network device.

What would useful would be means for sharing an IP address assigned to a first network device by a second network device such that packets originating from the second network device appear to be originating from the first network device.

SUMMARY

An embodiment of the present invention provides means for sharing an IP address assigned to a first network device by a second network device such that packets originating from the second network device appear to be originating from the first network device. In another embodiment of the present invention, the first network device is a general computer (herein, simply a "computer") and the second network device is a VoIP subscriber gateway.

It is therefore an aspect of the present invention to present an ISP a single MAC and IP address in a system comprising two network devices connected in series.

It is another aspect of the present invention that packets can be sent from two network devices wherein the packets appear to be originating from a single device with a single IP and MAC address.

It is still another aspect of the present invention to permit a subscriber to VoIP services using a VoIP subscriber gateway to connect to the Internet through an ISP that enforces a single MAC and IP address without the need for a NAT-equipped router.

It is yet another aspect of the present invention to permit a network device to be interposed between a user's computer and an Internet access device such that the network device appears invisible to the ISP while placing minimal restrictions on the use of the computer.

These and other aspects of the present invention will become apparent from a review of the general and detailed descriptions that follow.

An embodiment of the present invention is a method whereby packets from a network device in series between a user's computer and an Internet access device appear to be originating from the computer. In this embodiment, the network device monitors interactions between the computer and the ISP. The network devices gain information about the computer's network services configuration. Using this information the network device injects additional network traffic that, while invisible to the computer, appears to the ISP to be coming from the computer. The network device accomplishes this task by sending messages (comprising packets) from one or more specified ports using the IP address of the computer. The specified ports are not used by the computer. In this case, the network device is effectively masquerading as the computer.

Responses directed to the specified ports are addressed to the computer but intended for the network device. The network device captures these packets and processes them for its own purposes.

The restrictions placed on the computer with this technique are minimal. Specifically, the computer must not use the specified ports used by the network device. To enforce this restriction, any attempt to use these ports by the computer will be blocked by the network device. Blocking inhibits any possible communication confusion arising between communications intended for the network device and communications intended for the computer.

In an embodiment of the present invention, a method of sharing an IP address between a first and second network device comprises assigning an IP address to the first network device and reserving one or more port numbers for use solely by the second network device. The second network device is connected serially between the first network device and an Internet access device. The second network device creates packets using the IP address and one of the one or more reserved port numbers and sends the packets over the Internet via an Internet access device. In another embodiment of the present invention, the first network device is a computer, the second network device is a VoIP subscriber gateway, and the Internet access device is a DSL modem, a cable modem, a wireless modem or a dial-up modem. According to an embodiment of the present invention, the computer may be a desktop computer, a laptop computer, or a personal digital assistant.

In yet another embodiment of the present invention, the method further comprises creating a first device packet at the first network device. The first device packet is sent to the second network device. The second network device determines whether the first device packet uses the reserved port number. If the first device packet uses a port number other than the reserved port number, the first device packet is sent to the Internet access device. If the first device packet uses the reserved port number, the packet is discarded.

In another embodiment of the present invention, the method further comprises receiving at the second network device incoming packets from the Internet access device. A determination is made whether the incoming packet is directed to the reserved port. If the incoming packet is directed to the reserved port, the incoming packet is processed by the second network device. If the incoming packet is directed to a port other than the reserved port, the incoming packet is sent to the first network device.

In yet another embodiment of the present invention, a system for sharing an IP address comprises a first network device having an assigned IP address. The first network device is adapted to reserve one or more port numbers for use solely by a second network device. A second network device is connected serially between the first network device and an Internet access device. The second network device is adapted to create packets using the IP address of the first network device and one of the one or more reserved port numbers and to send the packets to the Internet access device. In an alternate embodiment, the first network device is a computer and the second network device is a VoIP subscriber gateway. In yet another embodiment of the present invention, the Internet access device is a DSL modem, a cable modem, a wireless modem or a dial-up modem. According to an embodiment of the present invention, the computer may be a desktop computer, a laptop computer, or a personal digital assistant.

In yet another embodiment of the present invention, the first network device creates a first device packet and sends it to the second network device. The second network device determines whether the first device packet uses the reserved port number. If the first device packet uses a port number other than the reserved port number, the first device packet is sent to the Internet access device. If the first device packet uses the reserved port number, the packet is discarded.

In another embodiment of the present invention, the second network device receives incoming packets from the Internet access device. A determination is made whether the incoming packet is directed to the reserved port. If the incoming packet is directed to the reserved port, the incoming packet is processed by the second network device. If the incoming packet is directed to a port other than the reserved port, the incoming packet is sent to the first network device.

A non-transitory computer-readable storage medium with an executable program stored thereon, wherein the program instructs a microprocessor of a Voice over Internet Protocol (VoIP) subscriber gateway, when executed, comprising:

logic to select a port number and to block data packets using the selected port number from being sent to an Internet Access device coupled to the VoIP subscriber gateway from a computing device coupled to the VoIP subscriber gateway;

logic to determine an external IP address assigned to the computing device by an Internet Service Provider (ISP);

logic to receive voice data input from a telephone device coupled to the VoIP subscriber gateway;

logic to create VoIP data packets related to the voice data input using the external IP address assigned to the computing device as a source IP address of the VoIP data packets and using the selected port number as a source of the VoIP data packets;

logic to send at least one VoIP data packet over the Internet to a VoIP service provider gateway via the Internet access device and the ISP;

logic to receive at least one computer data packet from the computing device, wherein the at least one computer data packet uses the external IP address assigned to the computing device by the ISP as a source IP address; and logic to send the at least one computer data packet received from the computing device over the Internet via the Internet access device when the at least one computer data packet does not use the selected port number as a source port number of the computer data packet.

DETAILED DESCRIPTION

An embodiment of the present invention provides a method whereby packets from a network device in series between a user's computer and an Internet access device appear to be originating from the computer.

In an embodiment of the present invention, a method of sharing an IP address between a first and second network device comprises assigning an IP address to the first network device and reserving one or more port numbers for use solely by the second network device. The second network device is connected serially between the first network device and an Internet access device. The serial connection between the first and second network devices and the connection between the second network device and an Internet access device may be made by means known in the art. By way of illustration and not as a limitation, these connections may be accomplished via a wired or a wireless path.

The second network device creates packets using the IP address and one of the one or more reserved port numbers and sends the packets to the Internet access device. In another embodiment of the present invention, the first network device is a computer and the second network device is a VoIP subscriber gateway. In still another embodiment of the present invention, the Internet access device may be a dial-up modem, a wireless modem, a DSL modem, or a cable modem.

In yet another embodiment of the present invention, a system for sharing an IP address comprises a first network device having an assigned IP address. The first network device is adapted to reserve one or more port numbers for use solely by a second network device. A second network device is connected serially between the first network device and an Internet access device. The second network device is adapted to create packets using the IP address of the first network device and one of the one or more reserved port numbers and to send the packets to the Internet access device. In an alternate embodiment, the first network device is a computer and the second network device is a VoIP subscriber gateway. By way of illustration and not as a limitation, a computer may be a laptop computer, a personal digital assistant, or any other computing device that may be connected to a network.

Figure 1:
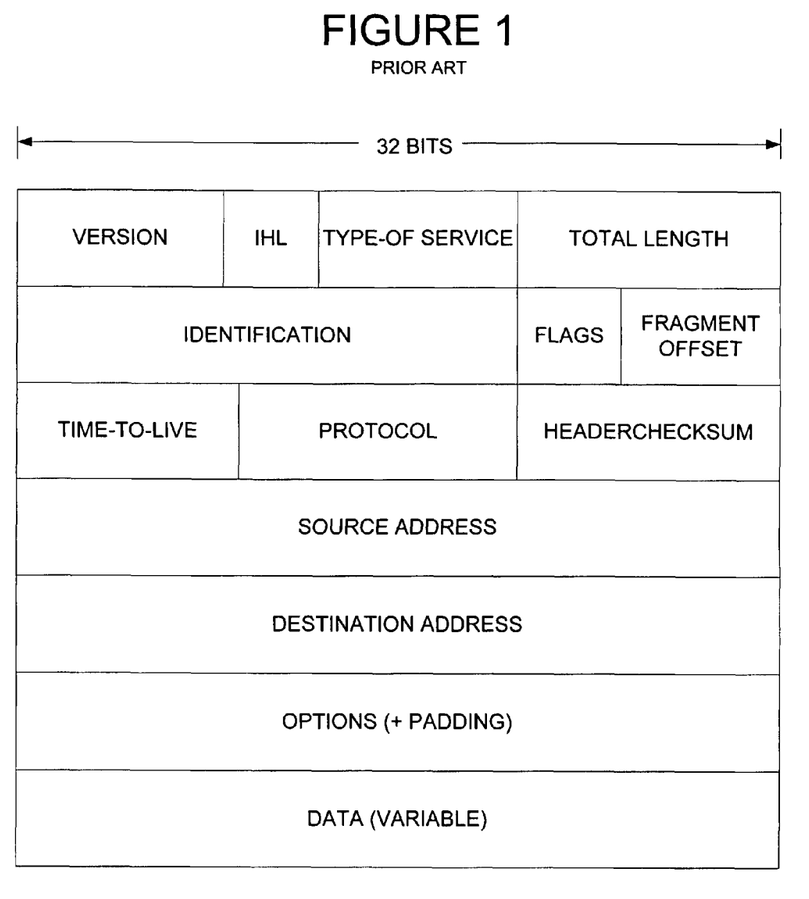
FIG. 1 illustrates the structure of an IP packet.
Figure 2:
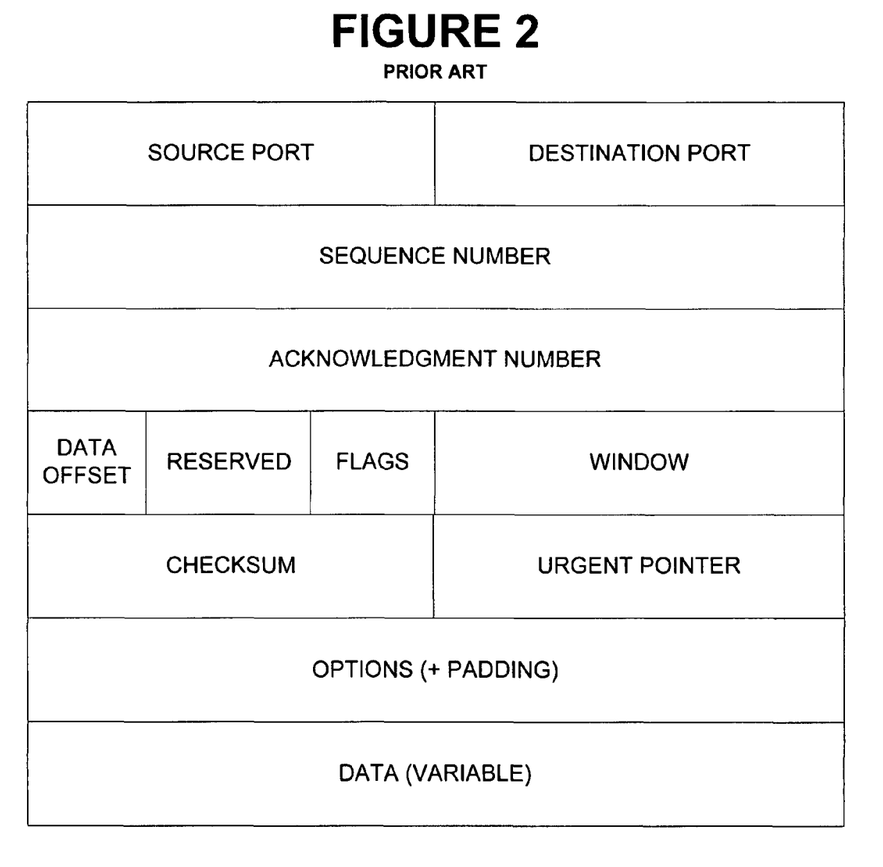
FIG. 2 illustrates the structure of a TCP packet.

Referring to FIG. 1, the structure of an IP packet is illustrated as known in the art. Of importance in this structure are source and destination addresses of the packet. FIG. 2 illustrates the structure of a TCP packet as known in the art. The TCP packet comprises the source and destination port information.

Figure 3:
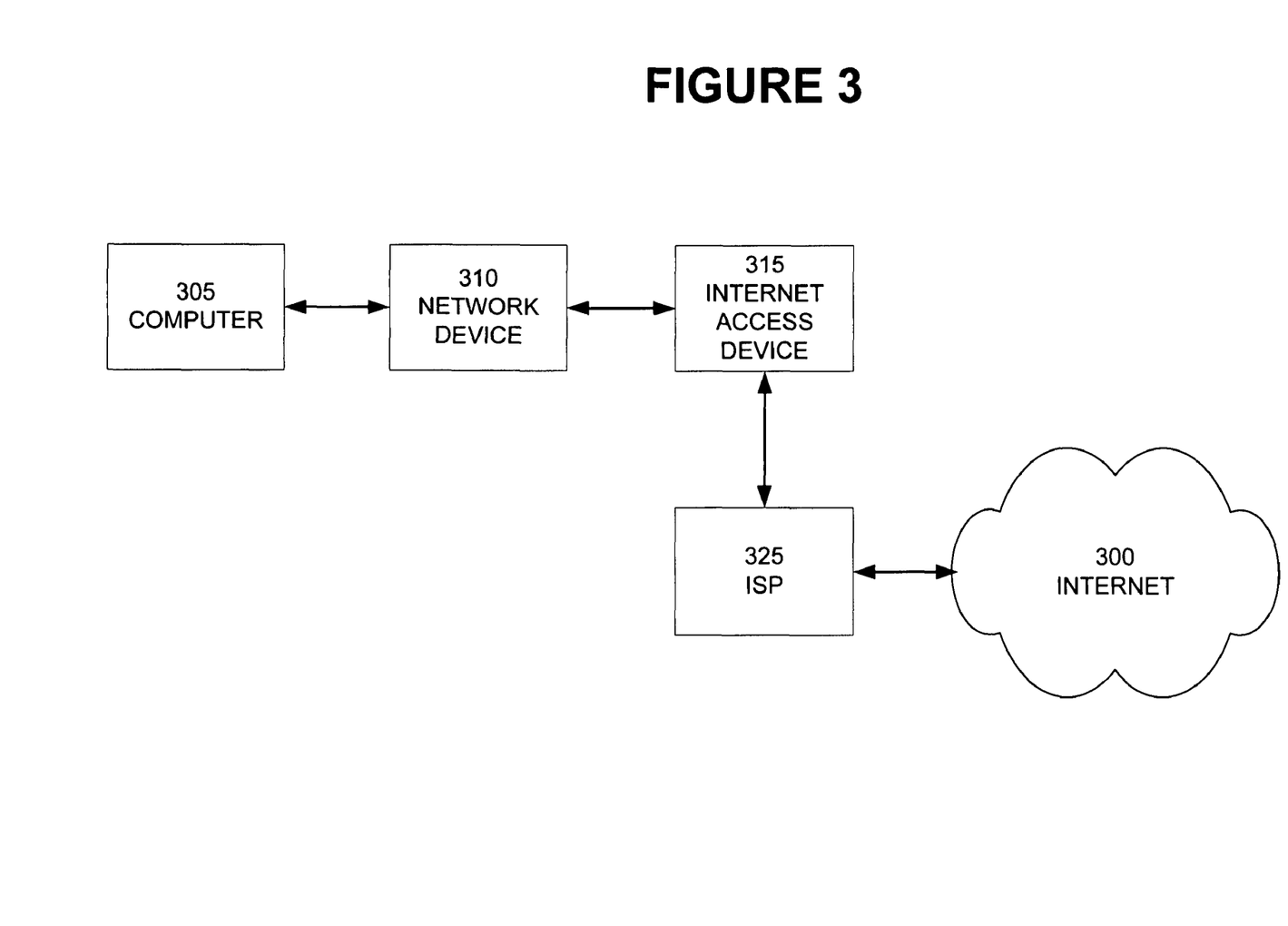
FIG. 3 illustrates a system configuration according to an embodiment of the present invention.

FIG. 3 illustrates a system configuration according to an embodiment of the present invention. Using TCP/IP, a computer 305 accesses the Internet 300 through ISP 325. The ISP 325 connects to Internet access device 315, which receives communications from computer 305 through a network device 310. Internet access device 315 passes the IP address assigned by the ISP 325 to computer 305. Messages sent by computer 305 are delivered to the Internet 300 using the registered address.

Generally, when a computer wants to "talk" to another computer on the Internet it starts a session with that other computer. For a computer to be contacted to create such a session, it must "listen" for the attempt to start a session. The listening is done via port-numbers. The calling computer also needs a port number so that it can receive responses. This port number comes from a range that is allocated for starting sessions and is unique for the life of that session. If more than one session is open, each session has it own unique port number. The session is defined by its two endpoints each defined by an IP address and a port number.

Referring again to FIGS. 1 and 2, the TCP/IP packets convey the source and destination IP addresses and the source and destination port numbers. Referring to FIG. 3, for network device 310 to be able to communicate with other devices over the Internet 300, it must present a unique source address acceptable to ISP 325. If ISP 325 recognizes the source address, the packets from network device 310 will be sent to the destination address. The source IP address/port number pair will be used by the destination to send a response back to the network device 310.

Figure 4:
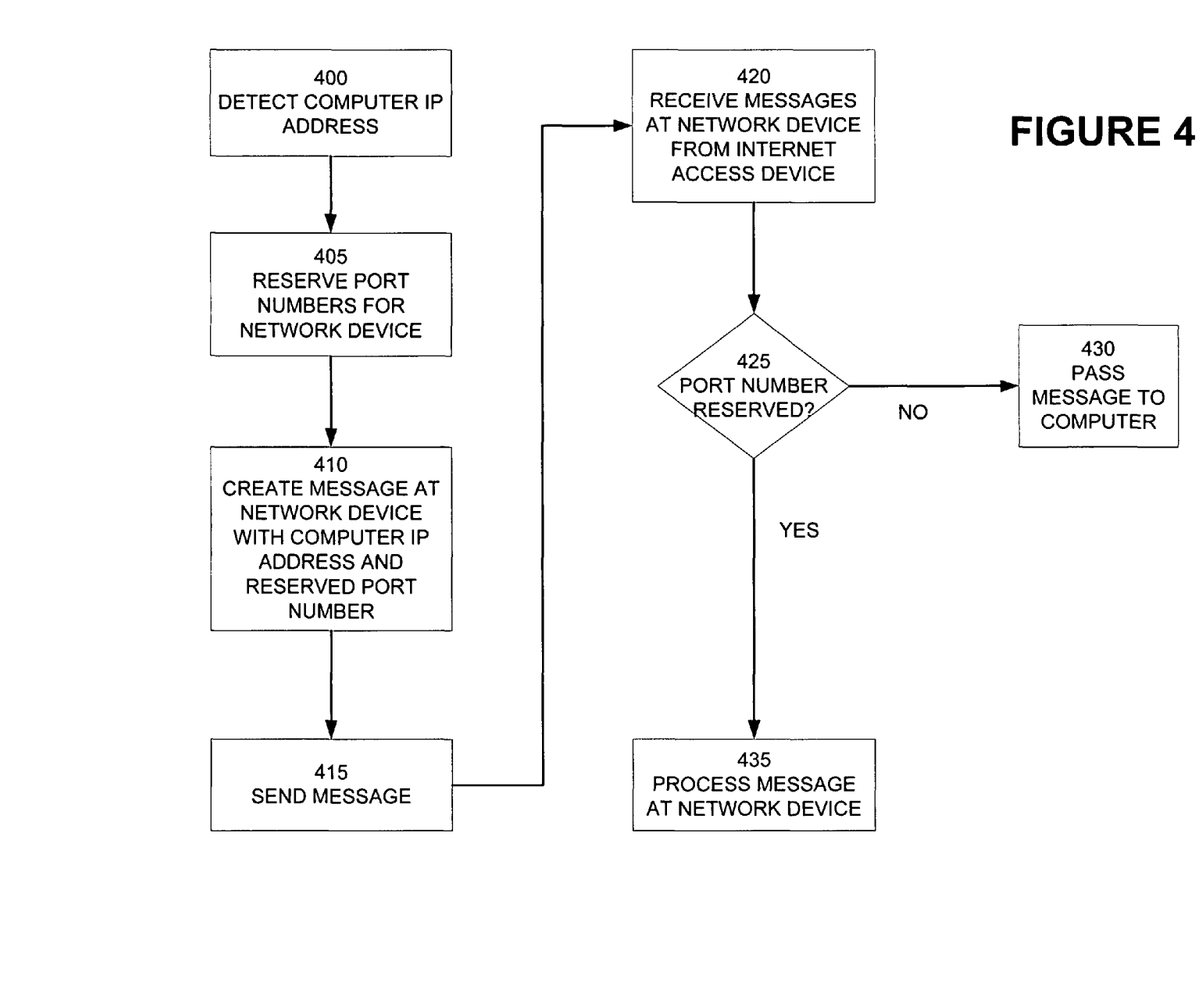
FIG. 4 illustrates a process by which a network device creates and receives messages according to an embodiment of the present invention

FIG. 4 illustrates a process by which a network device creates and receives messages according to an embodiment of the present invention.

A network device detects the computer IP address 400 assigned to the computer by an Internet access device. The Internet access device receives the IP address from the ISP used by the computer to access the Internet. The network device reserves port numbers for its own use 405. The network device then creates a message using the computer IP address and one of the reserved port numbers 410. These values are placed in the TCP/IP headers and passed to the Internet access device 415.

The Internet access device receives messages from the Internet via the ISP and passes these to the network device 420. The network device evaluates the header information in each message to determine if the message is directed to one of the reserved ports 425. If the message is not directed to one of the reserved ports, the message is passed to the computer 430. If the message is directed to one of the reserved ports, the network device processes the message 435.

In order to prevent confusion as to the proper recipient of a message, any attempt by the computer to send a message from one of the reserved ports will be blocked by the network device.

Figure 5:
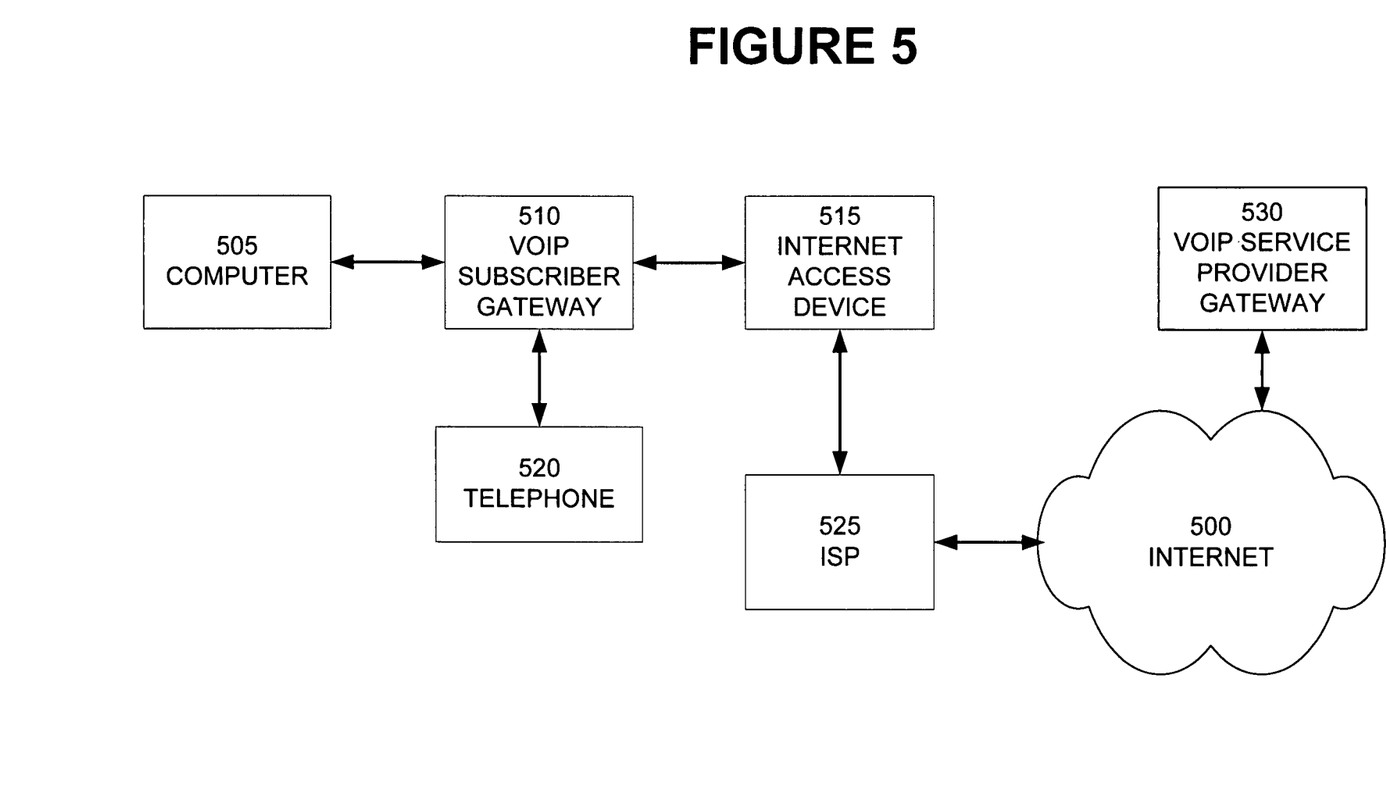
FIG. 5 illustrates a VoIP subscriber gateway configured in series between an Internet access device and a computer according to an embodiment of the present invention.

FIG. 5 illustrates a VoIP subscriber gateway configured in series between an Internet access device and a computer according to an embodiment of the present invention. Using TCP/IP, a computer 505 accesses the Internet 500 through ISP 525. The ISP 525 connects to Internet access device 515, which receives communications from computer 505 through a VoIP subscriber gateway 510. Internet access device 515 passes the IP address assigned by the ISP 525 to computer 505. Messages sent by computer 505 are delivered to the Internet using the registered address.

In this embodiment, VoIP subscriber gateway 510 receives voice signals from telephone 520 and processes these signals for communication over the Internet. In this embodiment, call set-up and routing are performed via a VoIP service provider gateway 530. Packets that are generated by VoIP subscriber gateway 510 are directed to VoIP service provider gateway 530 using the method described in the discussion relating to FIG. 4.

By way of example and not as a limitation, the VoIP subscriber gateway is a MG-2 Internet Talker manufactured by i2 Telecom International, Inc.

A method whereby packets from a network device in series between a user's computer and an Internet access device appear to be originating from the computer has been disclosed. It will also be understood that the invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular.

What is claimed is:

1. A method of sharing an IP address, the method comprising:

receiving, at a VoIP subscriber gateway, data indicating assignment of an external IP address by an Internet Service Provider (ISP) to a computer coupled to the VoIP subscriber gateway, the external IP address enabling the computer to communicate over the Internet via an Internet access device coupled to the VoIP subscriber gateway and via the ISP;

reserving, at the VoIP subscriber gateway, a port number for use solely by the VoIP subscriber gateway for a telephone coupled to the VoIP subscriber gateway;

creating, at the VoIP subscriber gateway, packets related to the data received from the telephone using the external IP address assigned to the computer and the port number reserved by the VoIP subscriber gateway;

sending the packets over the Internet to a VoIP service provider gateway via the Internet access device and the ISP;

receiving at the VoIP subscriber gateway at least one packet from the computer, wherein the at least one packet from the computer contains a source IP address and a source port number;

sending the at least one packet received at the VoIP subscriber gateway over the Internet via the Internet access device using the external IP address when the at least one packet received from the computer uses the external IP address as the source address and does not use the port number reserved by the VoIP subscriber gateway as the source port number; and discarding the at least one packet received at the VoIP subscriber gateway from the computer when the at least one packet uses the external IP address as the source address and uses the port number reserved by the VoIP subscriber gateway as the source port number.

2. The method of sharing an IP address of claim 1, wherein the method further comprises:

receiving at the VoIP subscriber gateway at least one incoming packet addressed to the external IP address via the ISP; and sending voice data of the at least one incoming packet to the telephone coupled to the VoIP subscriber gateway when the at least one incoming packet is directed to the reserved port number.

3. The method of sharing an IP address of claim 1, wherein the computer is selected from the group consisting of a desktop computer, a laptop computer, and a personal digital assistant.

4. The method of sharing an IP address of claim 1, wherein the VoIP subscriber gateway communicates with the ISP via an Internet access device that comprises at least one of a dial-up modem, a DSL modem, a wireless modem, and a cable modem.

5. A system for sharing an IP address comprising:

a Voice over Internet Protocol (VoIP) subscriber gateway adapted to be connected serially between a computer and an Internet access device, the Internet access device being coupled to an Internet service provider (ISP) to provide the VoIP subscriber gateway and the computer access to the Internet;

wherein the VoIP subscriber gateway is adapted to receive data from a telephone coupled to the VoIP subscriber gateway;

wherein the VoIP subscriber gateway is adapted to create packets based on the data received from the telephone using an external IP address assigned to the computer by the ISP and a port number reserved for use by the VoIP subscriber gateway;

wherein the VoIP subscriber gateway is adapted to send the packets over the Internet using the external IP address to a VoIP service provider gateway via the Internet access device and the ISP;

wherein the VoIP subscriber gateway is adapted to receive at least one packet from the computer, wherein the at least one packet from the computer includes the external IP address as a source IP address;

wherein the VoIP subscriber gateway is adapted to send the at least one packet received from the computer over the Internet via the Internet access device using the external IP address as the source IP address when the at least one packet has a source port number that is not the port number reserved for use by the VoIP subscriber gateway; and wherein the VoIP subscriber gateway is adapted to discard packets received from the computer when the packets include the port number reserved by the VoIP subscriber gateway as the source port number and include the external IP address as the source IP address.

6. The system of claim 5, wherein the VoIP subscriber gateway is further adapted to:

receive at least one incoming packet addressed to the external IP address via the Internet access device; and send voice data of the at least one incoming packet to the telephone when the at least one incoming packet is directed to the port number reserved by the VoIP subscriber gateway.

7. The method of sharing an IP address of claim 1, further comprising setting up a call via the VoIP subscriber gateway in response to the data received from the telephone.

8. The method of sharing an IP address of claim 2, further comprising sending the at least one incoming packet to the computer when the at least one incoming packet is addressed to the external IP address and is directed to a port number other than the reserved port number.

9. The system of claim 5, wherein the VoIP subscriber gateway is further adapted to send the at least one packet received from the computer to the Internet access device when the at least one packets uses the external IP address as the source IP address and uses a port number other than the port number reserved by VoIP subscriber gateway.

10. The system of claim 6, wherein the VoIP subscriber gateway is further adapted to send the at least one incoming packet to the computer when the at least one incoming packet is addressed to the external IP address and is directed to a port number other than the port number reserved by VoIP subscriber gateway.

11. A non-transitory computer-readable storage medium with an executable program stored thereon, wherein the program instructs a microprocessor of a Voice over Internet Protocol (VoIP) subscriber gateway, when executed, comprising:

logic to select a port number and to block data packets using the selected port number from being sent to an Internet Access device coupled to the VoIP subscriber gateway from a computing device coupled to the VoIP subscriber gateway;

logic to determine an external IP address assigned to the computing device by an Internet Service Provider (ISP);

logic to receive voice data input from a telephone device coupled to the VoIP subscriber gateway;

logic to create VoIP data packets related to the voice data input using the external IP address assigned to the computing device as a source IP address of the VoIP data packets and using the selected port number as a source of the VoIP data packets;

logic to send at least one VoIP data packet over the Internet to a VoIP service provider gateway via the Internet access device and the ISP;

logic to receive at least one computer data packet from the computing device, wherein the at least one computer data packet uses the external IP address assigned to the computing device by the ISP as a source IP address; and logic to send the at least one computer data packet received from the computing device over the Internet via the Internet access device when the at least one computer data packet does not use the selected port number as a source port number of the computer data packet.

12. The non-transitory computer-readable storage medium of claim 11, wherein the at least one VoIP data packet includes a call setup data packet.

13. The non-transitory computer-readable storage medium of claim 11, further comprising logic to process VoIP data packets addressed to the external IP address and received from the VoIP service provider gateway and logic to provide output voice data to the telephone device.

* * * * *